S. JOHNSTON.
Harvester Rake.
No. 86,554.
Patented Feb. 2, 1869.
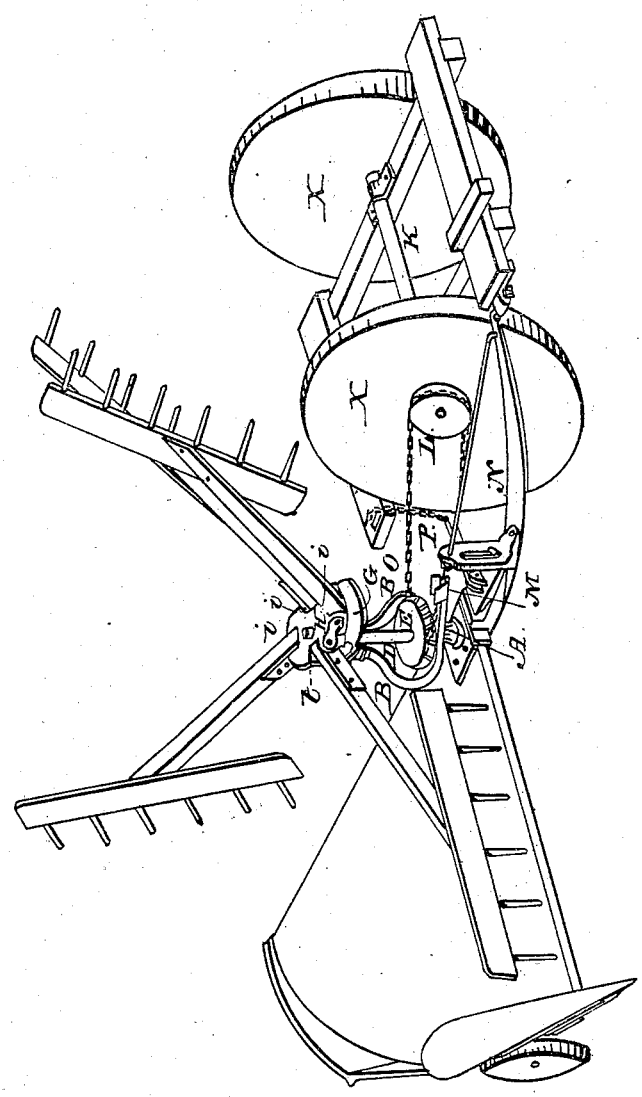

UNITED STATES PATENT OFFICE.

SAMUEL JOHNSTON, OF SYRACUSE, NEW YORK.

IMPROVEMENT IN HARVESTER-RAKES.

Specification forming part of Letters Patent No. 86,554, dated February 2, 1869.

*To all whom it may concern:*

Be it known that I, SAMUEL JOHNSTON, of Syracuse, in the State of New York, have invented a new and useful Improvement in Combined Rake and Reel Harvesters; and I do hereby declare the following to be a full and exact description thereof, reference being had to the annexed drawings, making a part of this specification, which represent a perspective view of my improvement.

The nature of my improvement consists in an improved mode of driving the revolving rake and reel, and is specially applicable when they are mounted upon a hinged finger-beam or platform of a hinged finger-beam machine.

The revolving rake and reel is of the kind heretofore described and patented to me, consisting of a series of radial arms carrying rake-heads, the arms being pivoted at their inner ends to a head or hub, H, by means of recesses I I in said hub. The cam G is of the kind heretofore patented by me, and has an inner groove-surface, against which the knee-piece moves.

The head H is mounted on a vertical shaft, which shaft is sustained in a yoke-shaped iron casting, B B, terminating in a flat foot, A, which is bolted upon the inner end of the finger-beam. On top of the yoke-piece B B the cam G is supported. On the shaft D a horizontal sprocket-pulley, E, is fitted. There are two main driving-wheels, X X, attached to the main driving-shaft in the usual manner, and on the inner end of the main shaft is a vertical sprocket-pulley, L.

An intermediate guide is placed between the vertical and horizontal sprocket-wheels. The revolving rake and reel are driven by an endless chain passing directly from the vertical to the horizontal sprocket-wheel, the half-twist in the chain being preserved by the guide, which also keeps the chain in its place.

As before stated, the improvement is applicable especially to combined revolving rakes and reels with a vertical axis, when located on the finger-beam or platform of a hinged-bar machine. It is proper to add that the rake is fitted with the apparatus for causing it to sweep off the grain, or to pass above the platform, at the pleasure of the driver, who is seated upon the main frame.

Having thus described my improvement, what I claim as my invention, and desire to secure by Letters Patent, is—

1. The combination of a vertical sprocket-wheel on the inner end of the main shaft, and a horizontal sprocket-wheel on the rake-shaft, an intermediate guide, and endless chain for driving the revolving rake and reel without any cog-gearing, substantially as described.

2. A standard for supporting the cam and sprocket-wheel shaft for guiding and driving a revolving rake and reel, cast in one piece, of a yoke shape, substantially as described.

SAMUEL JOHNSTON.

Witnesses:
 DANIEL TOWNER,
 JOHN TOWNER.